United States Patent

Jyumi

Patent Number: 5,225,232
Date of Patent: Jul. 6, 1993

[54] METHOD OF PROCESSING COD MILT

[75] Inventor: Yutaka Jyumi, Tokyo, Japan

[73] Assignee: Shin Tokyo International Incorporated, Tokyo, Japan

[21] Appl. No.: 942,923

[22] Filed: Sep. 10, 1992

[30] Foreign Application Priority Data

Mar. 2, 1992 [JP] Japan .................................. 4-78748

[51] Int. Cl.⁵ .......................... A23B 4/005; A23B 4/06
[52] U.S. Cl. ...................................... 426/643; 426/327; 426/268
[58] Field of Search ............... 426/643, 268, 327, 332, 426/335, 72

[56] References Cited

U.S. PATENT DOCUMENTS

| | | | |
|---|---|---|---|
| 3,804,964 | 4/1974 | Hogstedt | 426/643 |
| 3,959,507 | 5/1976 | D'Aquin | 426/643 |
| 4,136,204 | 1/1979 | Huges | 426/643 |
| 4,234,610 | 11/1980 | Ema | 426/643 |
| 4,504,498 | 3/1985 | Kissan | 426/643 |
| 4,670,277 | 6/1987 | Brotsky | 426/643 |
| 4,798,728 | 1/1989 | Sugisawa | 426/643 |
| 4,832,972 | 5/1989 | Toledo-Flores | 426/335 |
| 4,937,092 | 6/1990 | Brotsky | 426/643 |
| 4,978,546 | 12/1990 | Haram | 426/643 |

FOREIGN PATENT DOCUMENTS

| | | | |
|---|---|---|---|
| 625903 | 8/1961 | Canada | 426/327 |
| 54-2363 | 1/1979 | Japan | 426/643 |
| 61-151 | 12/1986 | Japan | 426/643 |

*Primary Examiner*—Carolyn Paden
*Attorney, Agent, or Firm*—Robert E. Burns; Emmanuel J. Lobato

[57] ABSTRACT

In a method of processing milt obtained from male cod fish, 5 Kg. of the milt is placed in a hot water bath equipped with automatic temperature control set at a temperature of 60 degrees C. to 80 degrees 1C. and heated for 8 to 10- seconds. The heated milt is then placed in a cold water bath consisting of 20 liters of water containing dissolved vitamin C in a concentration of 1% to 2% and at a temperature automatically controlled at 2 degrees C. to 3 degrees C. and maintained in the cold water bath for 8 to 10 seconds. The cooled milt is then vacuum packed in 200 g packages and placed in a freezer cooled by liquid nitrogen to −150 degrees C. to −170 degrees C. for 15 to 20 minutes. For storage, the frozen milt is placed in heat-insulated containers of polysterene foam plastic and placed in cold storage. To thaw the frozen milt, the heat-insulated container containing the milt is exposed to room temperature for 36 to 42 hours.

4 Claims, No Drawings

METHOD OF PROCESSING COD MILT

FIELD OF THE INVENTION

The present invention relates to a method of processing milt obtained from male cod fish. In the United States of America, cod milt is not commonly utilized for food, but in regions of Asia, especially in Japan, cod milt is highly prized as a superior delicacy. It is utilized in various ways. Raw cod milt is used as a dressing for "sushi". Cod milt is also cooked with vegetables, to which vinegar or lemon juice is added, and served as food.

BACKGROUND OF THE INVENTION

The conventional method of processing cod milt consists of solidifying the milt by rapid freezing and then thawing it just before preparation of the cuisine. However, when the cod milt is rapidly frozen, the moisture in the milt expands and ruptures the outer membranes. When the milt is thawed, the ruptured outer membranes permit liquid containing nourishment to leave the milt, thereby ruining its taste. Moreover, preserving the frozen milt for extended periods results in a change of color to greenish brown, which reduces the commercial value of the milt by 50%.

SUMMARY OF THE INVENTION

In the process of freezing the milt, to prevent rupture of the outer membranes by the cold shock of freezing, the following steps are taken which are essential points of the invention.

First, as a method of hardening the outer membranes, the milt is heated in a hot water bath at a selected temperature for a selected length of time. This results in solidifying and strengthening the membranes which constitute almost all of the protein in the milt.

Second, the heated milt is cooled in a cold water bath, of which the temperature is controlled, for the purpose of lowering the temperature of the heated milt to prevent slowing down the rate of refrigeration during the freezing process.

Third, the cooled milt is dehydrated and sealed in vacuum packages to prevent exposure of the milt to air and thereby prevent discoloration.

Fourth, the milt packed in vacuum packages is rapidly frozen as a method of preservation.

Fifth, the rapidly frozen milt is preserved in a heat-insulated container to eliminate the effects of change in temperature within a refrigerator in which the frozen milt is stored.

Six, to thaw the frozen milt, it is exposed to room-temperature within the heat-insulated container, as a method of assuring natural thawing.

A method of processing cod milt in accordance with the present invention consists of the following steps:

Step 1. Milt obtained from male cod fish, 5 kg, is placed in a hot water bath, equipped with automatic temperature control, set at temperature ranging from 60 degrees C., to 80 degrees C., and heated for 8 to 10 seconds.

Step 2. The heated milt (Step 1) is placed in a cold water bath, equipped with automatic temperature control, set at temperatures ranging from 2 degrees C., to 3 degrees C., and cooled for 8 to 10 seconds.

The foregoing cold water bath consist of 20 liters of water containing dissolved Vitamin C, in concentration of 1% to 2%, which inhibits the discoloration of the milt during cooling.

Step 3. The cooled milt (Step 2) is dehydrated by centrifuge, after which the milt in 200 g portions are each vacuum packed, to prevent the milt from contacting air.

Step 4. The vacuum packed milt (Step 3) are placed in a freezer using liquified nitrogen and subjected to very low temperatures, ranging from −150 degrees C. top −170 degrees C., for 15 to 20 minutes, and frozen.

Step 5. For storage, the vacuum packed frozen milt (Step 4) are placed in heat-insulated containers made of foam polysterene plastic, and the containers are placed in cold storage. Long term storage is conducted in such a way that the containers are not affected by the fluctuation in temperatures resulting from opening and closing the doors of the cold storage.

Step 6. To thaw the frozen milt, the heat-insulated container stuffed with the milt, is exposed to room-temperature, from 36 hours to 42 hours, and allowed to thaw naturally.

What I claim is:

1. A method of processing milt obtained from male cod fish which comprises the steps of placing a selected quantity of such milt in a hot water bath equipped with automatic temperature control set at a temperature ranging from 60 degrees C. to 80 degrees C. and maintaining said milt in said bath for a time period of 8 to 10 seconds, removing said quantity of milt from said hot bath and placing it in a cold water bath, equipped with automatic temperature control set at a temperature ranging from 2 degrees C. to 3 degrees C. and maintaining said milt in said cold water bath for a time period of 8 to 10 seconds,, said cold water bath containing-dissolved vitamin C in a concentration of 1% to 2% to inhibit discolorations of said milt during cooling, dehydrating the cooled milt by centrifuge and thereafter vacuum packing said milt in selected portions to prevent the milt from contacting air, placing the packaged milt in a freezer cooled by liquified nitrogen to a temperature of −150 degrees C. to −170 degrees C. and maintaining said packaged milt in said freezer for 15 to 20 minutes and then placing resulting frozen milt packages in heat insulated containers for refrigerated storage.

2. A method of processing milt according to claim 1, in which said selected quantity of milt which is placed in said hot water bath and subsequently in said cold water bath is of the order of 5 Kg.

3. A method of processing milt according to claim 2, in which said cold water bath consists of 20 liters of water containing dissolved vitamin C in concentration of 1% to 2%.

4. A method of processing milt according to claim 1, in which said selected portions of milt which are vacuum packed and subsequently frozen are of the order of 200 g.

* * * * *